July 10, 1934.  H. J. FEDERSPIEL  1,965,799
DANDELION KILLER
Filed Nov. 15, 1933
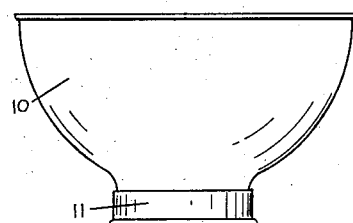
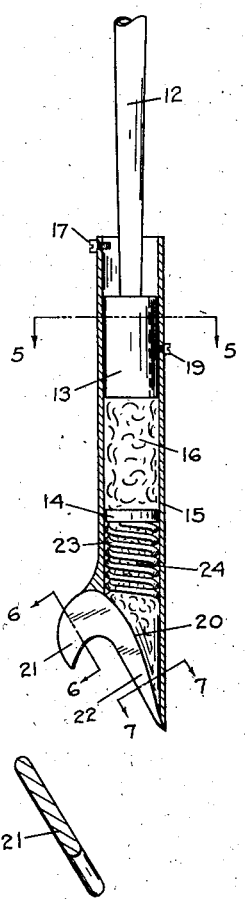
Inventor
H. J. Federspiel Patented July 10, 1934

1,965,799

UNITED STATES PATENT OFFICE 1,965,799

DANDELION KILLER

Henry J. Federspiel, Pueblo, Colo.

Application November 15, 1933, Serial No. 698,150

5 Claims. (Cl. 47—49)

My invention relates to devices for destroying dandelions and other weeds, one of its objects being the provision of a device for applying a liquid weed killer acting in combination with the knife to sever the roots of the dandelions.

Another of my objects is the provision of a V-shaped knife in which one of the inner edges is a cutting edge while the other is a blunt edge for guiding the device so that the thrust will result in an oblique cut in the dandelion root.

Another of my objects is the provision of a flat V-shaped cutter of sufficient width to sever the dandelion root and having means for automatically covering the knife with a liquid weed killer immediately preceding and during the severing of the root.

Another of my objects is the provision of a knife for severing dandelion roots combined with a pumping device for spreading a liquid weed killer over the surface of the knife.

Another of my objects is the provision of a dandelion killer having a cylinder and piston pump for discharging liquid weed killer.

Another object of the invention is the provision of a fibrous wicking for absorbing and retaining a charge of the liquid weed killer together with means for discharging the liquid weed killer from the wicking and onto the surface of a knife during the severing of the dandelion root.

Another object which I have in view is the provision of a dandelion killer including an oil can combined with a piston and cylinder pump for discharging the liquid weed killer, the piston stem being the nozzle of the oil can.

Having in view these objects and others which will be pointed out in the following description, I will now refer to the drawing, in which Figure 1 is a view partly in elevation and partly in median longitudinal section showing my entire dandelion killer, the parts being in the position which they occupy at the beginning of the stroke.

Figure 2 is also a view partly in elevation and partly in section, the oil can being omitted, the parts being in the position at the end of the cutting stroke.

Figure 3 is a view in side elevation of my dandelion killer without the oil can, the view showing the cylinder as it appears when looking from the right toward either Figure 1 or Figure 2.

Figure 4 is a median sectional view of the lower portion of the cylinder, showing particularly the arrangement of the wicking in the cylinder.

Figure 5 is a cross sectional view on the line 5—5 of Figure 2.

Figure 6 is a sectional view on the line 6—6 of Figure 2.

Figure 7 is a sectional view on the line 7—7 of Figure 2.

In the killing of the dandelions I prefer to use gasoline both because of the ease of obtaining it and because of its effectiveness as a dandelion killer. As a receptacle for the gasoline I use the common oil can 10 having a filler closure 11 and a somewhat elongated spout 12. These parts are combined with the pump shown in my drawing. Two collars 13 and 14 are tightly secured to the spout 12, preferably by welding to insure leakproof joints. The collars 13 and 14 are designed to fit snugly but smoothly in the cylinder 15. Between the two collars the spout 12 is surrounded by packing 16 so that the entire piston consists of the parts 13, 14 and 16 which all move in unison in the cylinder 15, the spout 12 functioning as the piston stem. A stop 17 is secured to a wall of the cylinder 15 near its upper edge, the purpose of this stop being to prevent the accidental withdrawal of the piston from the cylinder 15. The stop is made removable so that access can be had to the pumping mechanism. It is also desirable that the cylinder be not permitted to turn on the nozzle 12 during the operation of the device. For this purpose the collar 13 is provided with a longitudinal groove 18 shown in Figures 1 and 5. The pin 19 is secured in the cylinder 15 to project into the groove 18. In this manner the collar 13 is permitted to slide freely in the cylinder 15 but the cylinder 15 is not permitted to turn relative to the collar 13.

The lower end portion of the cylinder 15 is formed as shown in the drawing. For approximately half of its circumference it is flattened out while the other half is cut and turned into close proximity with the flattened surface so as to leave an elongated curved meeting edge as shown at 20 in Figures 1 and 2. The curvature is indicated in Figure 7. The meeting edge at 20 closes the mouth of the cylinder 15 to prevent leakage but to permit the forcing out of a liquid weed killer. Since my preferred weed killer is gasoline, it is necessary that the narrow passageway 20 be sufficiently narrow to retain the gasoline at ordinary pressures so that no excessive leakage can occur.

The flattened portion at the end of the cylinder 15 is cut into V-shape as shown in Figures 1 and 2. The arm 21 is relatively short and its edge is blunt. The arm 22 is relatively long and its edge is sharp. The point at which the two arms meet is in substantial alignment with a wall of the cylinder 15. The thrust is therefore exerted toward one end of the cutting edge and the blunt edge of the arm 21 thus guides the movement of the cutter against the dandelion root. The severing of the root is due to the oblique cut from the sharp edge of the arm 22.

The collar 14 is at the end of the nozzle 12. Pressure on the oil can 10 will cause the movement of the piston toward the lower portion of the cylinder. To restore the piston to its Figure 1 position I employ a coil spring 23 so that the thrust on the oil can will first compress the spring 23 after which the cutting action will take place. Within the spring 23 is a wicking 24 which is screwed into the spring 23 and which terminates in a lower pointed end. This wicking is in contact with the opening 20 throughout the length of the opening. It assists in closing the opening 20 against the leakage of gasoline or other liquid weed killer but it discharges the gasoline through the opening 20 when it is compressed by a thrust exerted against the oil can 10.

Pressure on the oil can 10 will force the entire piston from its Figure 1 position to its Figure 2 position. This compresses the spring 23 and the wicking 24. Since the wicking 24 is saturated with gasoline it will expel the gasoline. The piston and also the oil can with its gasoline will prevent back pressure so that gasoline thus expelled cannot travel backwardly through the nozzle 12. It must pass out through the opening 20 and it is thus spread over the entire surface of the arms 21 and 22 of the knife. It will thus be seen that the first movement of the piston will cause the discharge of the gasoline to cover the knife. Further pressure against the oil can 10 will force the knife through the dandelion root and this will result in the transfer of the gasoline film from the knife over the cut surface of the dandelion root.

The helical spring 23 is designed for counteracting the resistance of the soil. This is done to prevent the waste of gasoline and to avoid the killing of the grass roots. In this manner no gasoline is ejected until the knife is forced against the dandelion root which causes greater resistance to the passage of the knife than the soil does. This results in the compressing of the spring 23 and of the wicking 24 to begin the discharge of the gasoline at the beginning of the cutting operation. The wicking 24 absorbs and retains the single charge of gasoline which is ejected during the time that the knife passes through the dandelion root.

I have referred specifically to the use of my device as used for eradicating dandelions. It is to be understood, however, that the device may be used for eradicating any other noxious weeds found in the lawn or elsewhere. I also refer to the use of gasoline but this is merely because of the availability and the effectiveness of the gasoline when used directly on the cut surface of the root of a weed. Naturally any other suitable weed killer could be employed in the place of the gasoline.

Having thus described my invention in such full, clear, and exact terms that its construction and operation will be readily understood by others skilled in the art to which it pertains, what I claim as new and desire to secure by Letters Patent of the United States is:

1. A dandelion killer including a flat V-shaped knife having a short guiding arm and an elongated cutting arm, and a conduit for a liquid weed killer, said conduit having a narrow opening spaced from the cutting edge of said cutting arm and substantially coextensive therewith for the discharge of the liquid weed killer over the surface of said elongated cutting arm.

2. A dandelion killer including a cylinder terminating in a flattened end portion having a cutting edge, said cutting edge being oblique to the axis of said cylinder, said cylinder being provided with a narrow outlet spaced from and substantially coextensive in length with said cutting edge whereby a liquid weed killer may be ejected from said cylinder to cover said flattened end portion, and fibrous wicking material within said cylinder and covering the outlet thereof to evenly distribute the liquid weed killer over the surface of said flattened end portion.

3. A dandelion killer including a cylinder terminating at one of its extremities in a flattened end portion having a cutting edge inclined relative to the axis of said cylinder, said cylinder being provided with a narrow elongated outlet spaced from and substantially coextensive in length with said cutting edge for covering the surface of said flattened end portion with a liquid weed killer ejected from said cylinder, fibrous wicking within said cylinder and positioned against the outlet thereof for evenly distributing the discharged liquid weed killer, and a piston within said cylinder for forcing the liquid weed killer through said wicking and through the outlet of said cylinder and over the surface of the flattened end portion of said cylinder.

4. A dandelion killer including an oil can with an elongated spout, a flat V-shaped blade having a guiding arm and a cutting edge, means for securing said blade to said spout for limited slidable movement thereon in the direction of the length of said spout, said cutting edge being oblique relative to said spout, spring means for resisting the slidable movement of said spout relative to said blade, said spring means being yieldable on the application of a predetermined pressure, and means responsive to the yielding of said spring means for discharging a liquid weed killer from said oil can through said spout and over the entire cutting edge of said blade.

5. A dandelion killer including an oil can having an elongated spout, a piston surrounding and rigidly secured to said spout at the outer extremity thereof, a cylinder slidably receiving said piston, means for preventing rotation of said cylinder relative to said piston, said cylinder terminating in a flat V-shaped blade having an arm with a cutting edge and also having a guiding arm with a blunt edge, said cutting edge being oblique to the axis of said cylinder, said cylinder being provided with a discharge opening in close proximity to the surface of said first named arm, and wicking in said cylinder between said piston and discharge opening of said cylinder for discharging a liquid weed killer to cover the surface of said first named arm at the beginning of the cutting movement of said blade, and a helical spring within said cylinder and surrounding said wicking.

HENRY J. FEDERSPIEL.